United States Patent
Furukawa

[11] Patent Number: 6,135,222
[45] Date of Patent: Oct. 24, 2000

[54] INSTALLING STRUCTURE FOR AN ELECTRICALLY-DRIVEN WHEELCHAIR

[75] Inventor: Hisashi Furukawa, Gifu-ken, Japan

[73] Assignee: Nissin Medical Industries Co., Ltd., Aichi, Japan

[21] Appl. No.: 09/237,371

[22] Filed: Jan. 26, 1999

[30] Foreign Application Priority Data

Sep. 11, 1998 [JP] Japan ................ 10-258995

[51] Int. Cl.$^7$ ................ B60K 1/00
[52] U.S. Cl. ........... 180/65.5; 180/907; 180/297; 180/11; 280/242; 280/250.1; 280/289
[58] Field of Search ................ 180/907, 65.5, 180/295, 11; 280/242, 289, 250.1

[56] References Cited

U.S. PATENT DOCUMENTS

| | | | |
|---|---|---|---|
| 3,955,639 | 5/1976 | Cragg | 180/6.5 |
| 4,037,676 | 7/1977 | Ruse | 180/6.5 |
| 4,685,693 | 8/1987 | Vadjunec | 280/242 |
| 4,718,689 | 1/1988 | Lott | 280/289 |
| 4,744,578 | 5/1988 | Stearns | 280/242 |
| 4,961,473 | 10/1990 | Jones | 180/907 X |
| 5,291,959 | 3/1994 | Malblanc | 180/907 X |
| 5,351,774 | 10/1994 | Okamoto | 180/907 X |
| 5,540,297 | 7/1996 | Meier | 180/65.5 |
| 5,556,121 | 9/1996 | Pillot | 180/907 X |
| 5,782,483 | 7/1998 | Rogers et al. | 280/250.1 X |
| 5,904,214 | 5/1999 | Lin | 180/907 X |
| 5,964,473 | 10/1999 | Degonda et al. | 280/250.1 |
| 5,984,334 | 11/1999 | Dugas | 280/250.1 |
| 5,988,304 | 11/1999 | Behrendts | 180/907 X |
| 6,003,625 | 12/1999 | Neuling | 180/11 |

FOREIGN PATENT DOCUMENTS

| | | | |
|---|---|---|---|
| 0382873 | 8/1990 | European Pat. Off. | 180/907 X |
| 2061197 | 5/1981 | United Kingdom | 180/907 X |
| 2210589 | 6/1989 | United Kingdom | 180/907 X |

*Primary Examiner*—Lanna Mai
*Assistant Examiner*—Toan C To
*Attorney, Agent, or Firm*—Arent Fox Kintner Plotkin & Kahn PLLC

[57] ABSTRACT

In a wheelchair, a rear wheel part with a pair of rear wheels is assembled to the rear side of a frame in detachable state. The frame is constituted in foldable state. The rear wheel part and the rear side of the frame are provided with a locking member and a receiving member which can be coupled with each other and are arranged corresponding to these. The receiving member is provided with a concave locking surface at the side remote from the locking member. The locking member is provided with an insertion recess in which the receiving member can be inserted, and with a hook which can lock a locking surface of the receiving member inserted in the insertion recess. In the wheelchair, the rear wheel part can be simply assembled to or detached from the frame by the operation of the hook. Also the frame can be folded. Therefore even the wheelchair of heavy weight can be easily housed in a vehicle with a narrow housing space. Also the wheelchair can be simply assembled by the operation of the hook.

4 Claims, 9 Drawing Sheets

INSTALLING STRUCTURE FOR AN ELECTRICALLY-DRIVEN WHEELCHAIR

BACKGROUND OF THE INVENTION (1) Field of the Invention

The present invention relates to an assembling structure of a wheelchair. More specifically, the present invention relates to assembling structure of a wheelchair where a pair of rear wheels can be simply assembled to an or detached from a frame.

(2) Description of Related Art

In the prior art, for example, an electrically-driven wheelchair is constituted so that rear wheels are driven by an electric motor arranged in the wheelchair itself.

However, the electrically-driven wheelchair has a weight of about 30 kg, because the electrically-driven wheelchair in the prior art contains an electric motor unit comprising an electric motor and a battery operating the electric motor.

Therefore when the electrically-driven wheelchair is raised to be put in a vehicle, this work cannot be performed by one person. Particularly a powerless woman cannot perform any loading work of the electrically-driven wheelchair.

SUMMARY OF THE INVENTION

In this case, if the wheelchair can be dismantled to an easy assembling state, the wheelchair, as disassembled parts of light weight, can be put on a vehicle. That is, if the wheelchair can be dismantled simply, the electrically-driven wheelchair can be put in a vehicle easily by a single individual.

Further, if a frame of the wheel chair can be folded, housing the electrically-driven wheelchair in the vehicle will become easier.

If rear wheels can be simply disassembled and the frame can be folded in such manner, not only an electrically-driven wheelchair but also a general-purpose wheelchair can be easily put in a vehicle with a narrow housing space. As a result, moving of the wheelchair becomes convenient.

The present invention intends to solve the above-mentioned problems. That is, an object of the present invention is to provide assembling a structure of a wheelchair where even a wheelchair of heavy weight can be easily housed in a vehicle with a narrow housing space and can be assembled simply.

The foregoing object can be achieved by assembling structure of a wheelchair having a frame and a rear wheel part in following constitution. The frame has the rear side with the rear wheel part assembled therein in a detachable state, and is constituted in foldable state. The rear wheel part is provided with a pair of rear wheels. The rear wheel part and the rear side of the frame are provided with a locking member and a receiving member which can be coupled with each other and are arranged, respectively. The receiving member is provided with a concave locking surface at the side remote from the locking member. The locking member is provided with an insertion recess in which the receiving member can be inserted, and with a hook in which the locking surface of the receiving member inserted in the insertion recess can be locked.

In assembling the structure of a wheelchair according to the present invention, a frame is stretched from a folded state and a receiving member is inserted in an insertion recess of a locking member. A hook is locked to a locking surface of the receiving member. Then a rear wheel part having a pair of rear wheels can be assembled to the rear side of the frame.

When a wheelchair is to be put in a vehicle, at first, the locking of the hook to the locking surface of the receiving member is released. The receiving member is separated from the insertion recess of the locking member. Then the rear wheel part can be disassembled from the frame. And then the frame is folded. The wheelchair is put in the vehicle in the state that the folded frame and the rear wheel part are disassembled.

Consequently in assembling the structure of the wheelchair according to the present invention, the rear wheel part can be simply assembled to or detached from the frame by an operation of the hook. Also the frame can be folded. Therefore even a wheelchair of heavy weight can be easily housed in a vehicle with a narrow housing space. The wheelchair can be assembled simply by operation of the hook.

The wheelchair may be an electrically-driven wheelchair where an electric motor unit driving the rear wheels is arranged at the rear wheel part.

In this case, since the rear wheel part is provided with the electric motor unit and is heavy in weight, it can be transported in the state separated from the frame. Therefore the electrically-driven wheelchair of heavy weight can be easily put on a vehicle or the like.

The rear wheel part is provided with a pair of main rear wheels arranged at the front side and with a pair of auxiliary rear wheels arranged at the rear side. Further it is preferable that the rear wheel part is assembled to the frame at the coupling portion between the locking member and the receiving member in a rockable state in the vertical direction along the longitudinal direction.

In this case, even at a portion having step difference such as a staircase, the rear wheel part rocks to the frame in the vertical direction along the longitudinal direction. That is, in the wheelchair of this structure, even at a portion having step difference such as a staircase, both the main rear wheel and the auxiliary rear wheel can be grounded. Therefore the wheelchair of this structure can travel the portion having a step difference stably.

Further the wheelchair may be constituted as follows. The hook is constituted by a locking piece arranged at the top end side for locking the locking surface, and a holding lever arranged at the base side for holding while the locking of the locking surface is released. The hook is biased by the biasing means so that it can be restored to the arrangement position to allow locking of the locking surface, and also the hook is pivotally supported between the locking piece and the holding lever in a rotatable state to the bottom part side of the insertion recess and is arranged to the locking member. Further when the locking piece is inserted in the insertion recess of the receiving member, the locking piece is pushed by the receiving member and is rotated to the bottom part side of the insertion recess, and when the receiving member is arranged to the bottom part of the insertion recess, the hook is restored to the arrangement position to allow locking of the locking surface by the biasing force of the biasing means.

In such a wheelchair, at the assembling state of the wheelchair, when the receiving member is inserted in the insertion recess, the locking piece is pushed by the receiving member and is rotated to the bottom part side of the insertion recess. Therefore the receiving member can be inserted in the insertion recess smoothly. When the receiving member is arranged to the bottom part of the insertion recess, the locking piece is restored to the arrangement position to allow locking of the locking surface by the biasing force of the biasing means.

That is, if the receiving member is simply inserted to the bottom part of the insertion recess in the locking member, the receiving member can be automatically locked by the locking member. Therefore in such a wheelchair, the rear wheel part can be assembled to the frame quite simply.

When the rear wheel part is separated from the frame, the holding lever is held and the hook is rotated. The locking piece is separated from the locking surface. Then the locking of the receiving member by the locking member can be released. Therefore in such a wheelchair, the rear wheel part can be disassembled from the frame simply.

In the above-mentioned wheelchair with the biasing means, it is preferable that the insertion recess of the locking member is opened at the upper side and is formed substantially in the vertical direction.

In assembling structure of the wheelchair, when the rear wheel part is assembled to the frame, each receiving member can be simply inserted to the bottom part of the insertion recess in the locking member utilizing the gravity. Further in this case, the looking surface of the receiving member can be automatically locked by the locking piece of the hook in the locking member. Therefore in assembling the structure of the wheelchair, the rear wheel part can be assembled to the frame quite simply. Also in assembling the structure of the wheelchair, the position defining the receiving member in the longitudinal direction is performed not by the hook but by the circumferential surface in the longitudinal direction in the insertion recess. Therefore the coupling strength of the receiving member to the locking member in the moving direction (longitudinal direction) of the wheelchair can be improved.

DESCRIPTION OF THE PREFERRED EMBODIMENTS

The present invention will be described by way of embodiments shown in the accompanying drawings as follows. The present invention is not limited to the embodiments. All modifications within the requirements of claims or equivalents relating to the requirements shall be included in the scope of the claims.

Figure 1:
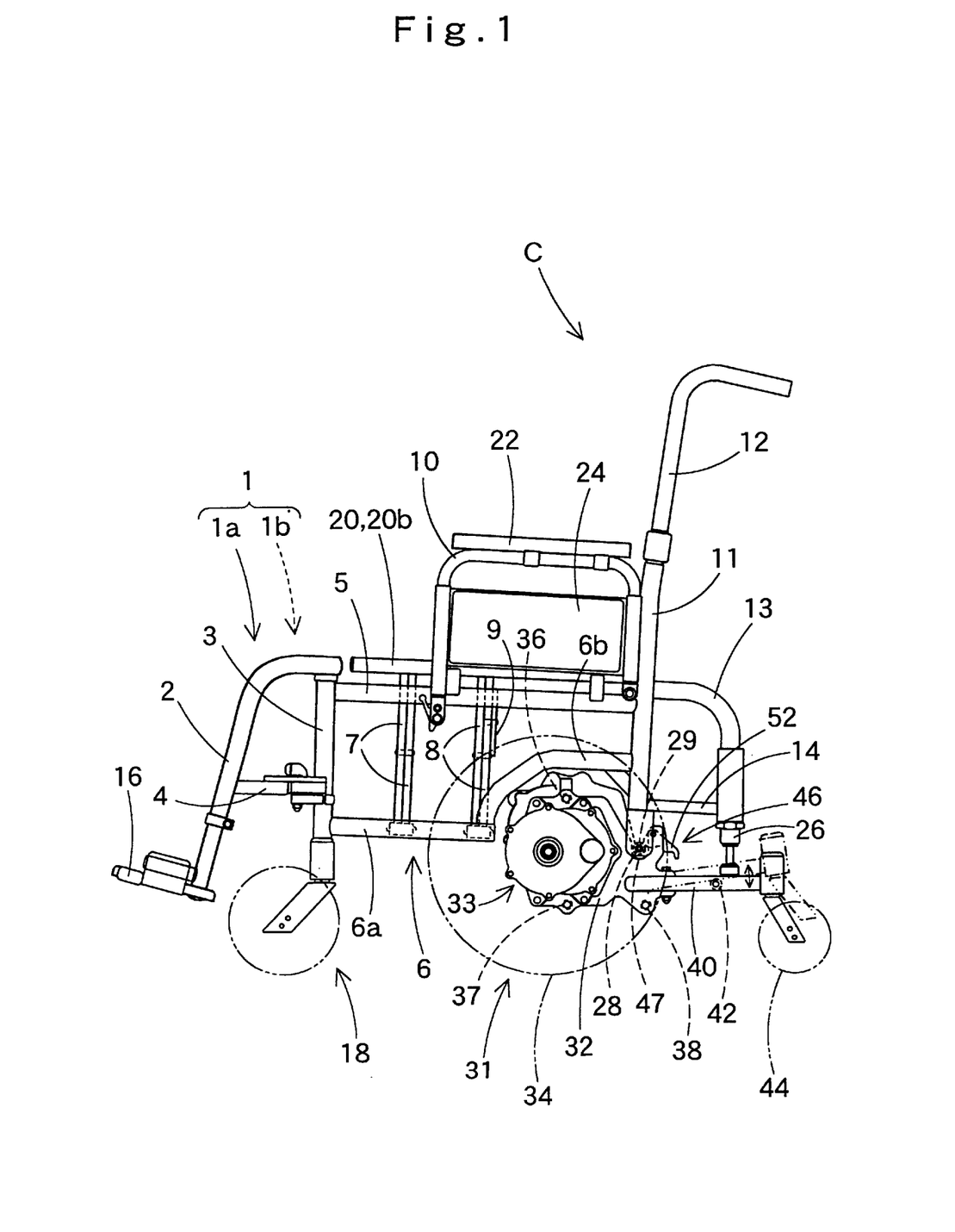
FIG. 1 is a schematic side view showing a wheelchair in an embodiment of the invention.
Figure 2:
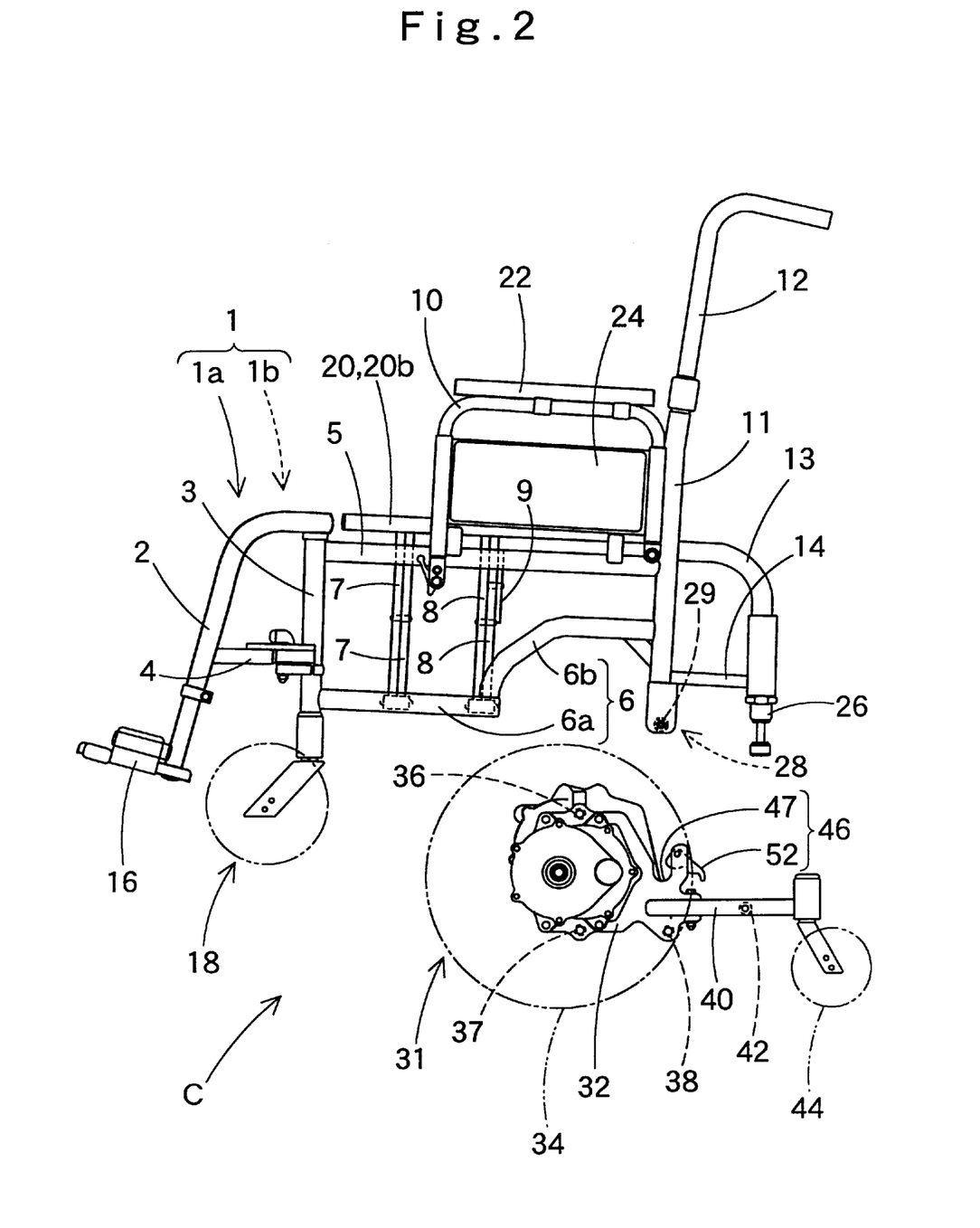
FIG. 2 is a schematic side view of the wheelchair in the embodiment showing the state that a rear wheel part is disassembled from a frame.
Figure 3:
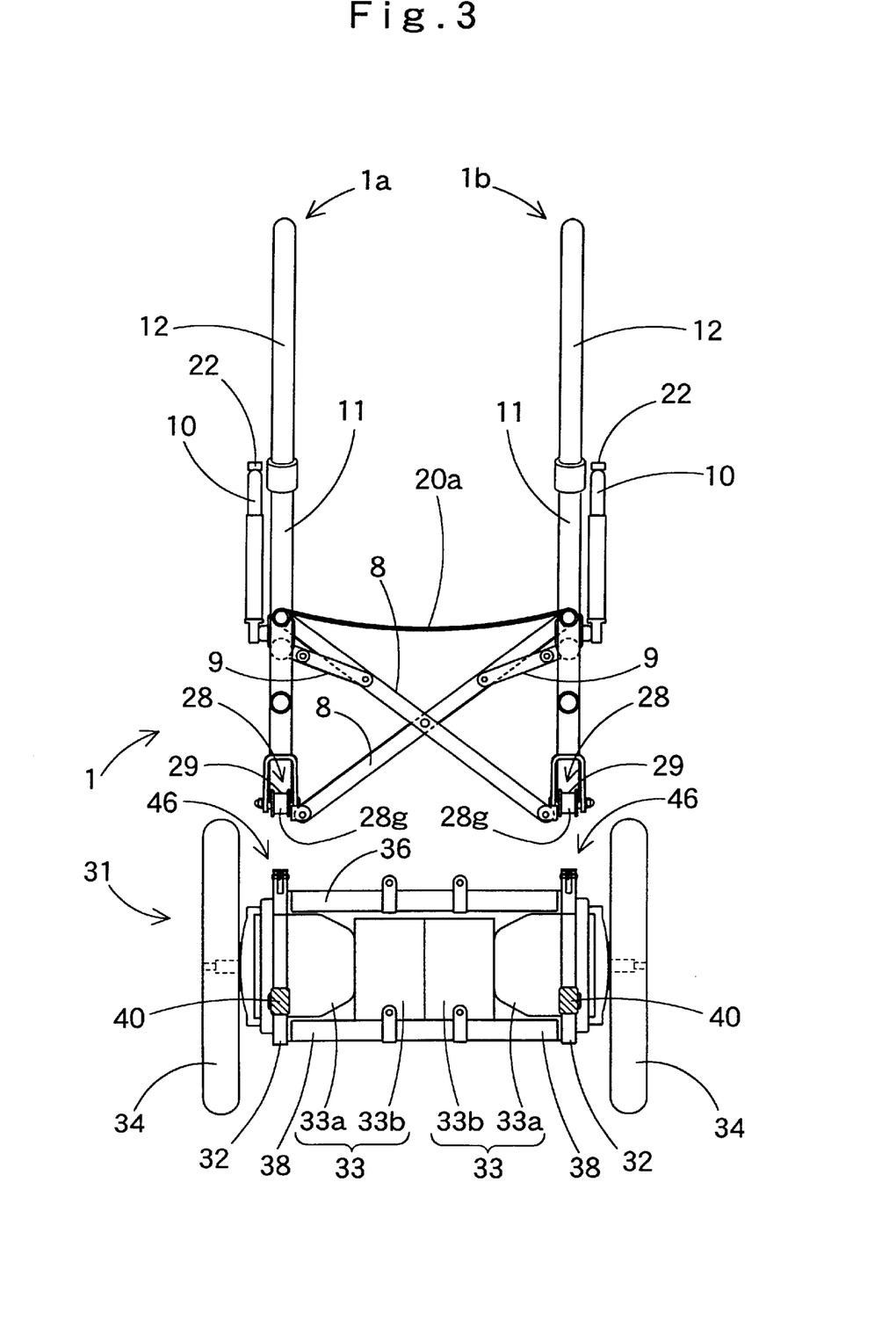
FIG. 3 is a schematic rear view of the wheelchair in the embodiment showing the state that a rear wheel part is disassembled from a frame.

A wheelchair C in an embodiment is an electrically-driven wheelchair as shown in FIGS. 1–3. In the wheelchair C, a rear wheel part 31 is detachably assembled with a frame 1.

The frame 1 is provided with a leg pipe 2, a front pipe 3 and a back pipe 11 arranged in the order from the front side. The leg pipe 2 is provided with a foot rest 16. The front pipe 3 has the upper side coupled with the upper side of the leg pipe 2 and is arranged in the vertical direction. The back pipe 11 is arranged at the rear side of the frame 1 and substantially in the vertical direction. The front pipe 3 and the back pipe 11 are coupled with each other at the upper side and the lower side by a seat pipe 5 and a base pipe 6 respectively. Also the base pipe 6 is provided with a straight part 6*a* at the front side and a curved part 6*b*. The straight part 6*a* extends in the horizontal direction. The curved part 6*b* is curved so that a recess retreating upward is provided from the rear end of the straight part 6*a*.

Further the leg pipe 2 is coupled with the upper side of the front pipe 3 in rotatable state rightward and leftward. A member designated by reference numeral 4 in FIGS. 1 and 2 is a support pipe supporting the leg pipe 2 supplementally. An arm pipe 10 is coupled with the seat pipe 5. The arm pipe 10 is provided with an elbow pad 22 and a skirt guard 24. The skirt guard 24 covers the inside of the wheelchair C. A back rest pipe 12 is coupled with the upper side of the back pipe 11. Further at the rear side of the back pipe 11, a staying pipe 13 and a support pipe 14 are connected. The staying pipe 13 is formed from the intermediate position in the vertical direction of the back pipe 11 and the lower side is extended in rear downward direction. The support pipe 14 extends rearward from the lower side of the back pipe 11 and supports the lower side of the staying pipe 13.

Figure 4:
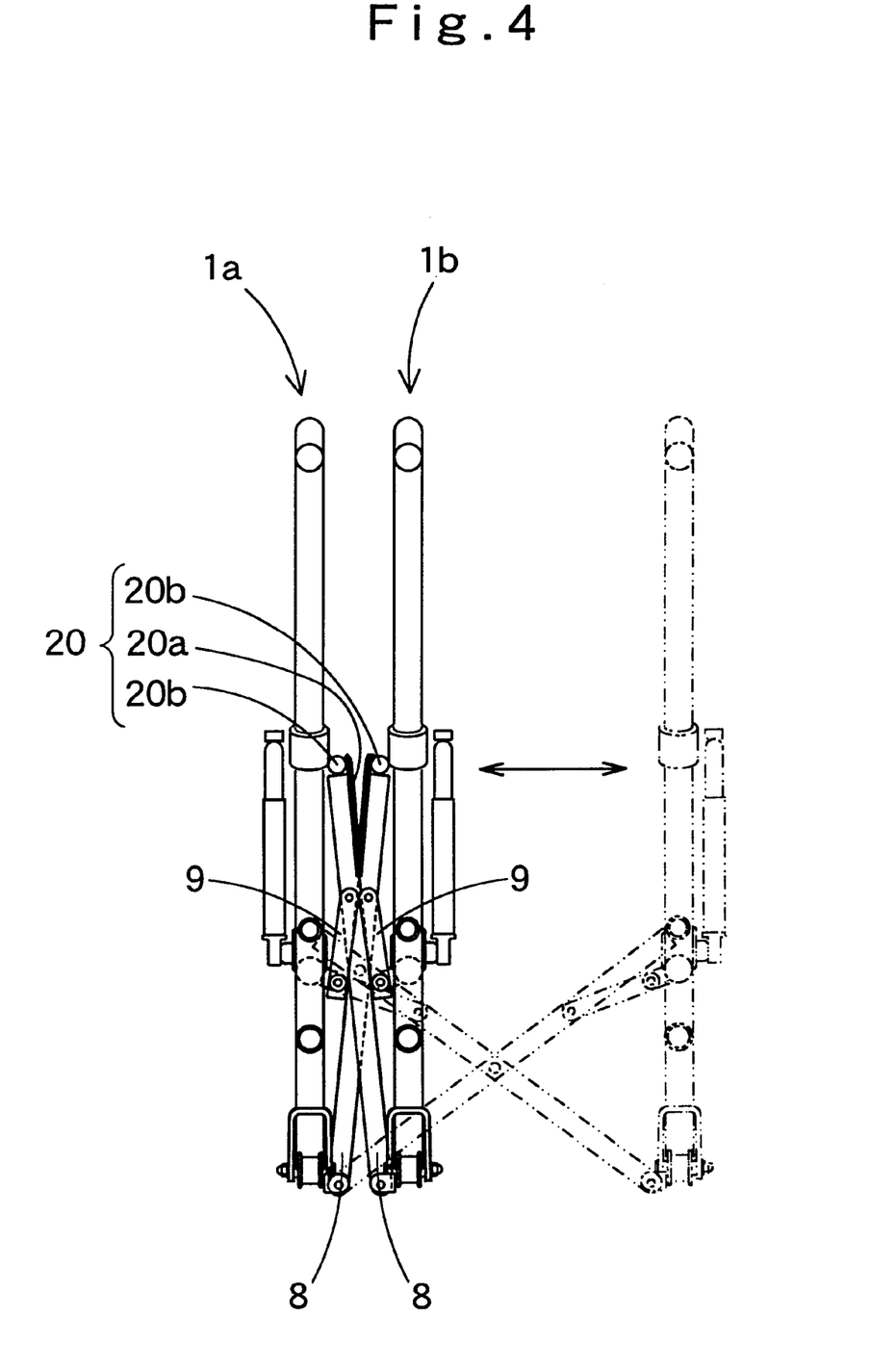
FIG. 4 is a schematic rear view of the wheelchair in the embodiment showing a folded state of a frame.

These pipes 2, 3, 4, 5, 6, 10, 11, 12, 13, 14 of the frame 1 are arranged in respective pairs in the left and right sides of the wheelchair C. These pipes 2, 3, 4, 5, 6, 10, 11, 12, 13, 14 constitute left and right side frame parts 1*a*, 1*b* respectively in the left and right sides of the wheelchair C. These left and right side frames 1*a*, 1*b*, as shown in FIGS. 1 and 4, are arranged so as to narrow the distance in the lateral direction utilizing cross bars 7, 8 and an auxiliary bar 9 described later. That is, these left and right side frames 1*a*, 1*b* are arranged so as to fold the frame 1 in the lateral direction.

Also at the lower side of each of the left and right front pipes 3, a front wheel 18 comprising a caster wheel is arranged.

At the lower side of each of the left and right staying pipes 13, an air damper 26 is arranged. Each air damper 26 abuts on each of left and right base stays 40 described later of the rear wheel part 31. Each air damper 26 performs the buffer action of the rear wheel part 31 during the rocking motion.

At the upper side of each of the left and right seat pipes 5, 5, a seat part 20 is arranged as shown in FIGS. 1, 3, 4. The seat part 20 is constituted by a seat member 20*a* and core pipes 20*b*, 20*b*. The seat member 20*a* has flexibility. Left and right edges of the seat member 20*a* are connected to the core pipes 20*b*, 20*b* respectively.

The cross bars 7, 7 arranged at the front side cross each other in the lateral direction and are pivotally supported mutually at the crossing position. The upper ends of the individual cross bars 7, 7 are fixed to the left and right core pipes 20b, 20b of the seat part 20 respectively. Also the lower ends of the individual cross bars 7, 7 are pivotally supported in rotatable state leftward or rightward to the right and left base pipes 6 being different from the core pipes 20b in the direction of the left side and the right side.

Also the cross bars 8, 8 arranged at the rear side cross each other and are pivotally supported mutually at the crossing position. The upper ends of the individual cross bars 8, 8 are fixed to the left and right core pipes 20b of the seat part 20 respectively. The lower ends of the individual cross bars 8, 8 are pivotally supported in rotatable state leftward or rightward to the individual base pipes 6 being different in the direction of the left side and the right side respectively. Further at the upper side of each of the cross bars 8, 8, the lower end of the auxiliary bar 9 is pivotally supported. The upper ends of the individual auxiliary bars 9, 9 are pivotally supported to the seat pipes 5, 5 in the vicinity of the individual cross bars 8, 8 respectively. These auxiliary bars 9 are stoppers. That is, the distance between the left and right side frame parts 1a, 1b which is widend is limited to constant value by the individual auxiliary bars 9.

The rear wheel part 31 is provided with a pair of main rear wheels 34 and a pair of auxiliary rear wheels 44 as shown in FIGS. 2 and 3. The pair of main rear wheels 34 are arranged at the front side. The pair of auxiliary rear wheels 44 are arranged at the rear side. The individual main rear wheels 34 are supported at rotatable state to the left and right support brackets 32, 32 respectively. The individual main rear wheels 34 are rotated and driven by electric motor units 33 respectively. Each electric motor unit 33 comprises an electric motor 33a with a reduction gear and a battery 33b as a power source of the electric motor 33a. Action of each electric motor unit 33 is controlled by operation of an operator control panel (not shown). The operator control panel (not shown) is assembled in the vicinity of the seat pipe 5.

The left and right support brackets 32 are coupled with each other by three coupling stays 36, 37, 38 arranged in lateral direction. Ends of the left and right support brackets 32 is provided with a base stay 40 extending rearward.

The individual base stays 40 are coupled with each other by a coupling stay 42 arranged in the lateral direction. The auxiliary rear wheels 44 are arranged at the rear side of the individual base stays 40 respectively. Each auxiliary rear wheel 44 is constituted by a caster wheel.

In the case of the embodiment, a receiving member 28 and a locking member 46 are provided so that the rear wheel part 31 is detachably assembled to the frame 1. The receiving member 28 is formed at the lower end of each of the left and right back pipes 11 of the frame 1. The locking member 46 is fixed at the rear side of each of the left and right support brackets 32 of the rear wheel part 31.

Figure 5:
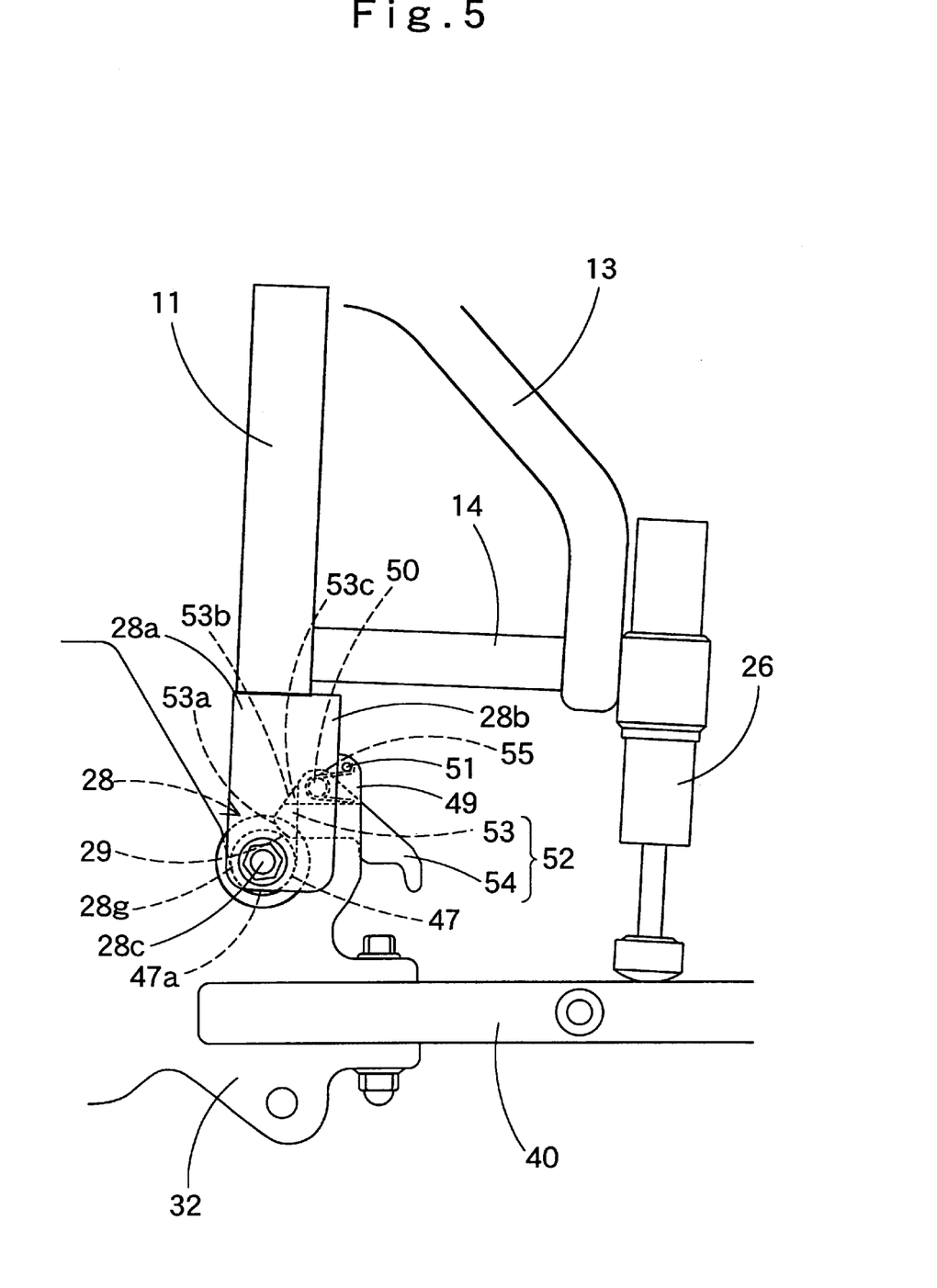
FIG. 5 is an enlarged side view of the wheelchair in the embodiment showing a coupling state of a locking member and a receiving member.
Figure 6:
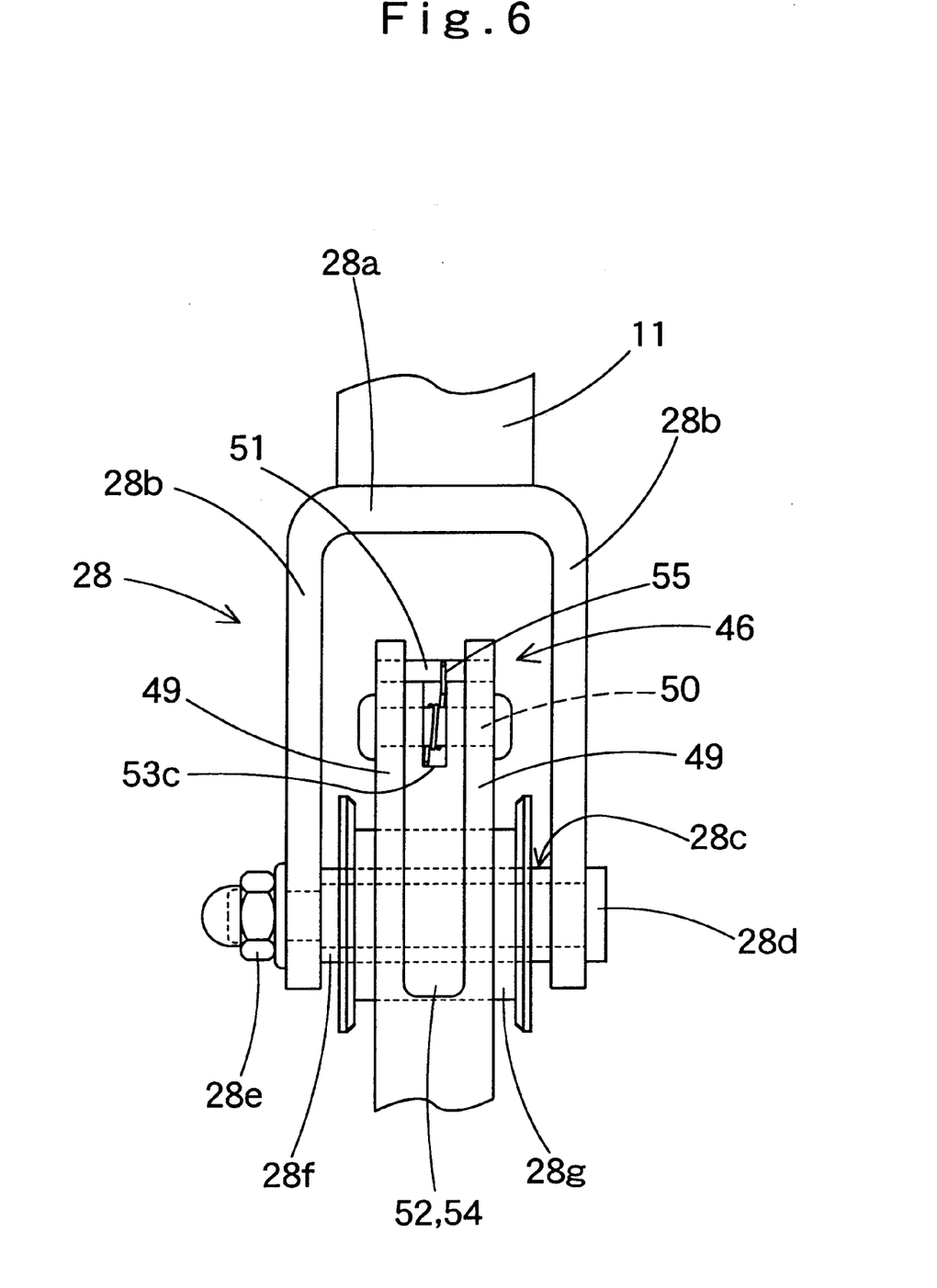
FIG. 6 is an enlarged rear view of the wheelchair in the embodiment showing a coupling state of a locking member and a receiving member.
Figure 7:
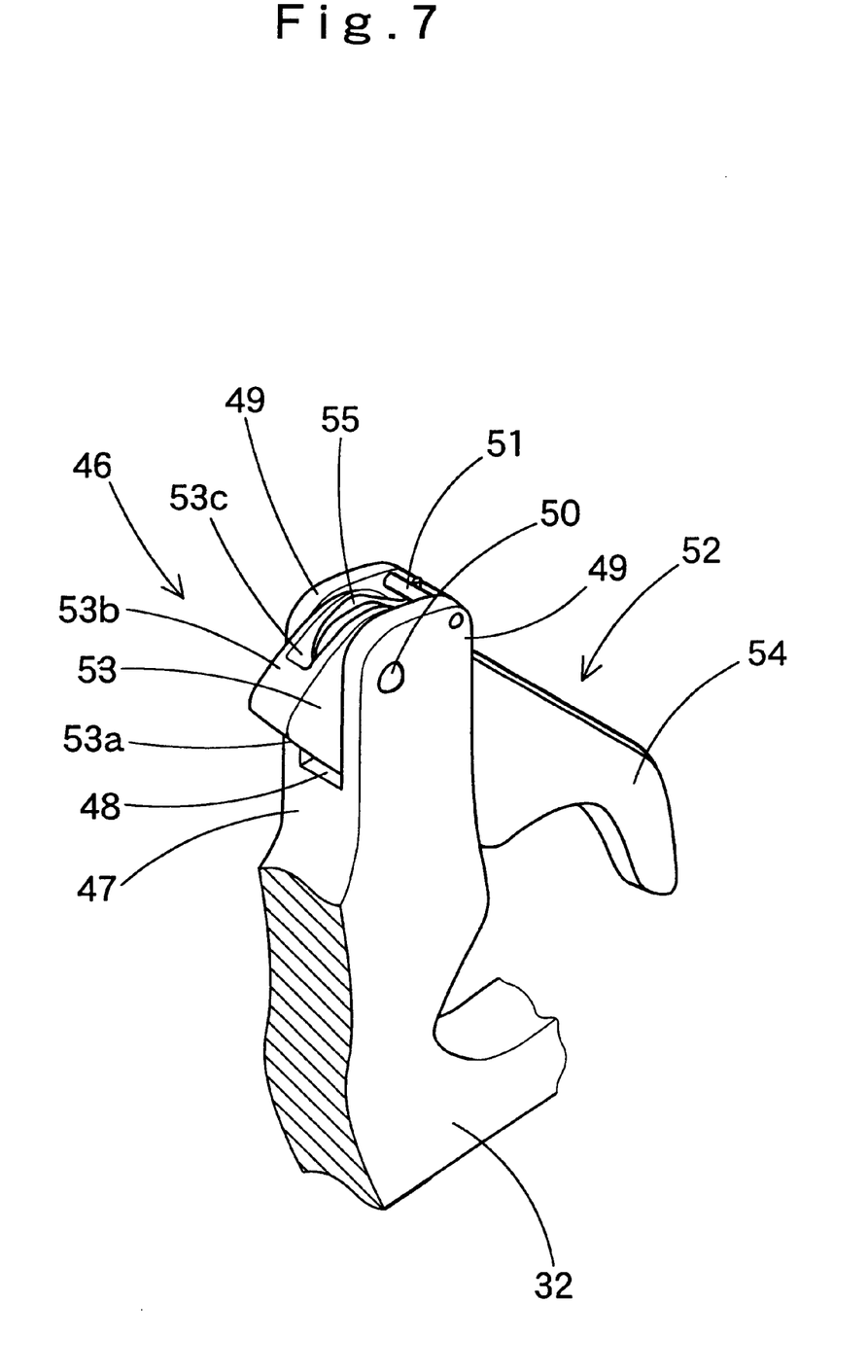
FIG. 7 is an enlarged perspective view of the wheelchair in the embodiment showing a coupling portion.

Each receiving member 28 is constituted by a bracket 28a, a support shaft 28c and a roller 28g as shown in FIGS. 5 and 6. The bracket 28a is made reverse U-like shape and is fixed to the lower end surface of each back pipe 11. The support shaft 28c is arranged so as to connect both wall parts 28b, 28b of the bracket 28a along the lateral direction. The roller 28g is externally fitted to the support shaft 28c. In the case of the embodiment, the support shaft 28c is constituted by a bolt 28d, a cap nut 28e and a collar 28f. The bolt 28d penetrates the wall parts 28b, 28b. The cap nut 28e is threadedly engaged with the bolt 28d. The collar 28f is externally fitted to the bolt 28d between the wall parts 28b, 28b. Length of the roller 28g is set longer than thickness of the support bracket 32.

The roller 28g is externally fitted in rotatable state to the support shaft 28c. Because it is intended that the rear wheel part 31 can be rocked in the vertical direction along the longitudinal direction to the frame 1. Further the upper side of the roller 28g is made a locking surface 29 to a locking piece 53 as described later provided at the locking member 46.

As shown in FIGS. 5–8, each locking member 46 is provided with an insertion recess 47 and a hook 52. The insertion recess 47 is formed with the upper side opened and is provided substantially in the vertical direction so that each roller 28g can be inserted from the upper side. The hook 52 is arranged at the rear edge side of the insertion recess 47.

Each hook 52 is housed in a housing recess 48. Also each hook 52 is pivotally supported to the support shaft 50 in rotatable state in the vertical direction along the longitudinal direction. The housing recess 48 is arranged between support walls 49, 49 opposed in the lateral direction at the rear side of each support bracket 32. The support shaft 50 is fixed between the support walls 49, 49. Each hook 52 is provided with a locking piece 53 and an operation lever 54. The locking piece 53 is positioned from the axially supported portion of the support shaft 50 to the top end side being the side of the insertion recess 47. The locking piece 53 can lock the roller 28g of the receiving member 28. The holding lever 54 is positioned from the pivotally supported portion of the support shaft 50 to the base side being the rear side of the wheelchair C. The holding lever 54 is held when the hook 52 is operated.

Further each hook 52 is provided with a torsion coil spring 55 as biasing means arranged at the locking piece 53. The coil spring 55 biases the hook 52 to the side of the arrangement position of locking the roller 28g. The spring 55 is externally fitted to the support shaft 50 within the recess 53c. The recess 53c is formed at the upper side of the locking piece 53. The recess 53c is in shape cut away in triangular plate. One end of the coil spring 55 is stopped by a stopper 51 arranged at the upper side of the support walls 49, 49. Other end of the coil spring 55 is brought into abutment on the inner circumferential surface of the recess 53c. The stopper 51 defines the rotational angle of the hook 52. That is, when the holding lever 54 is held and is operated and the locking piece 53 is separated from the locking position of the roller 28g, the stopper 51 abuts on the upper surface of the holding lever 54.

The locking piece 53 of each hook 52 is provided with a defining surface 53a and a guide surface 53b. The defining surface 53a is arranged at the lower surface side of the locking piece 53. The defining surface 53a can lock the locking surface 29 of the roller 28g. The guide surface 53b is arranged at the upper surface side of the locking piece 53. The guide surface 53b is formed in slanting so as to guide the entering of the roller 28g into the insertion recess 47.

Shape and size of the locking piece 53 and further the pivotally supported portion 50 of the hook 52 are set so that next operation of the locking piece 53 can be performed. That is, when the receiving member 28 is inserted into the insertion recess 47, setting is performed so that the locking piece 53 of the hook 52 can be pushed by the roller 28g of the receiving member 28 and can be rotated to the side of the bottom part 47a of the insertion recess 47. When the roller 28g of the receiving member 28 is arranged at the bottom part 47a of the insertion recess 47, setting is performed so that the locking piece 53 of the hook 52 can be restored to the position to allow locking of the locking surface 29 without interfering with the roller 28g by the biasing force of the spring 55. When the hook 52 is restored to the position where the locking surface 29 can be locked by the biasing force of the spring 55, the holding lever 54 abuts on the edge 48a (refer to FIG. 8) at the rear side of the housing recess 48 and is stopped.

In the wheelchair C of the embodiment, when it is used, first, from the folded state of the frame 1 shown by solid line in FIG. 4, the left and right side frame parts 1a, 1b are stretched as shown by dash-and-dot line in FIG. 4.

Figure 8:
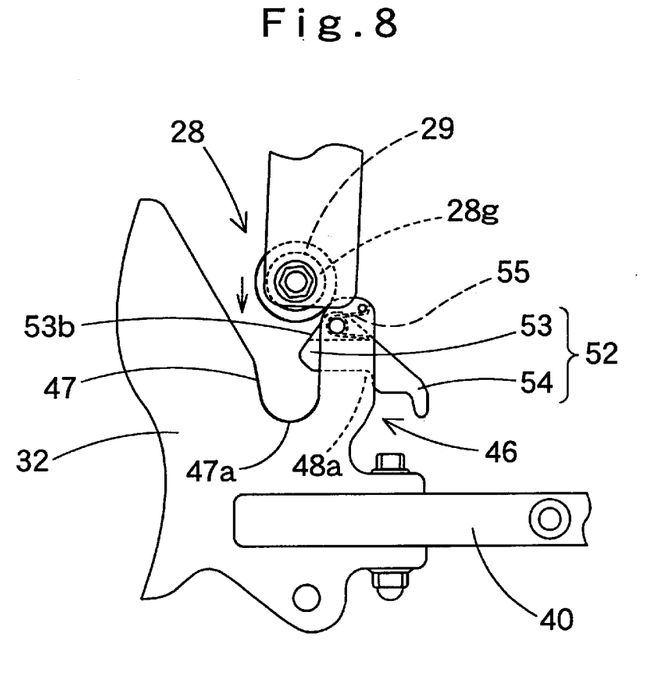
FIG. 8 is a diagram of the wheelchair in the embodiment showing the state that a receiving member is coupled to a locking member immediately before the coupling.
Figure 9:
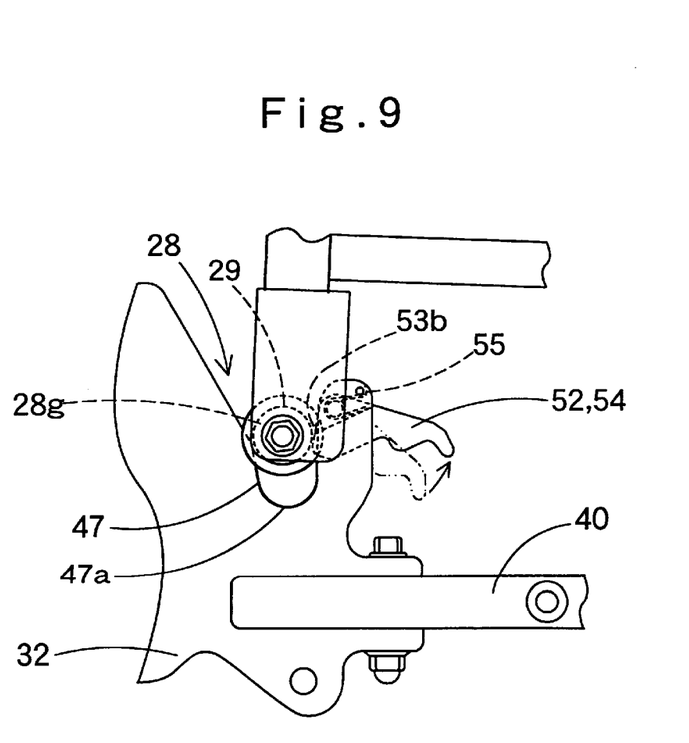
FIG. 9 is a diagram of the wheelchair in the embodiment showing the state that a receiving member is coupled to a locking member when the receiving member is to be inserted in an insertion recess.

Next as shown in FIGS. 8 and 9, each roller 28g of each receiving member 28 is inserted into the insertion recess 47 of each locking member 46 from the upper side to the lower side. The hook 52 is locked to the locking surface 29 of the receiving member 28. Then as shown in FIG. 1, the rear wheel part 31 can be assembled to the rear side of the frame 1 and the use as the wheelchair C becomes possible.

In the wheelchair C of the embodiment, at the insertion state into the insertion recess 47 of each receiving member 28, the guide surface 53b of the locking piece 53 of the hook 52 is pushed by the roller 28g of the receiving member 28 and the locking piece 53 is rotated to the side of the bottom part 47a of the insertion recess 47 against the biasing force of the spring 55. Next when the roller 28g of the receiving member 28 is arranged to the bottom part 47a of the insertion recess 47, the locking piece 53 of the hook is automatically restored to the position where the defining surface 53a can lock the locking surface 29, without interfering with the roller 28g by the biasing force of the spring 55. Therefore in the wheelchair C of the embodiment, the rear wheel part 31 can be assembled to the frame 1 quite easily.

Figure 10:
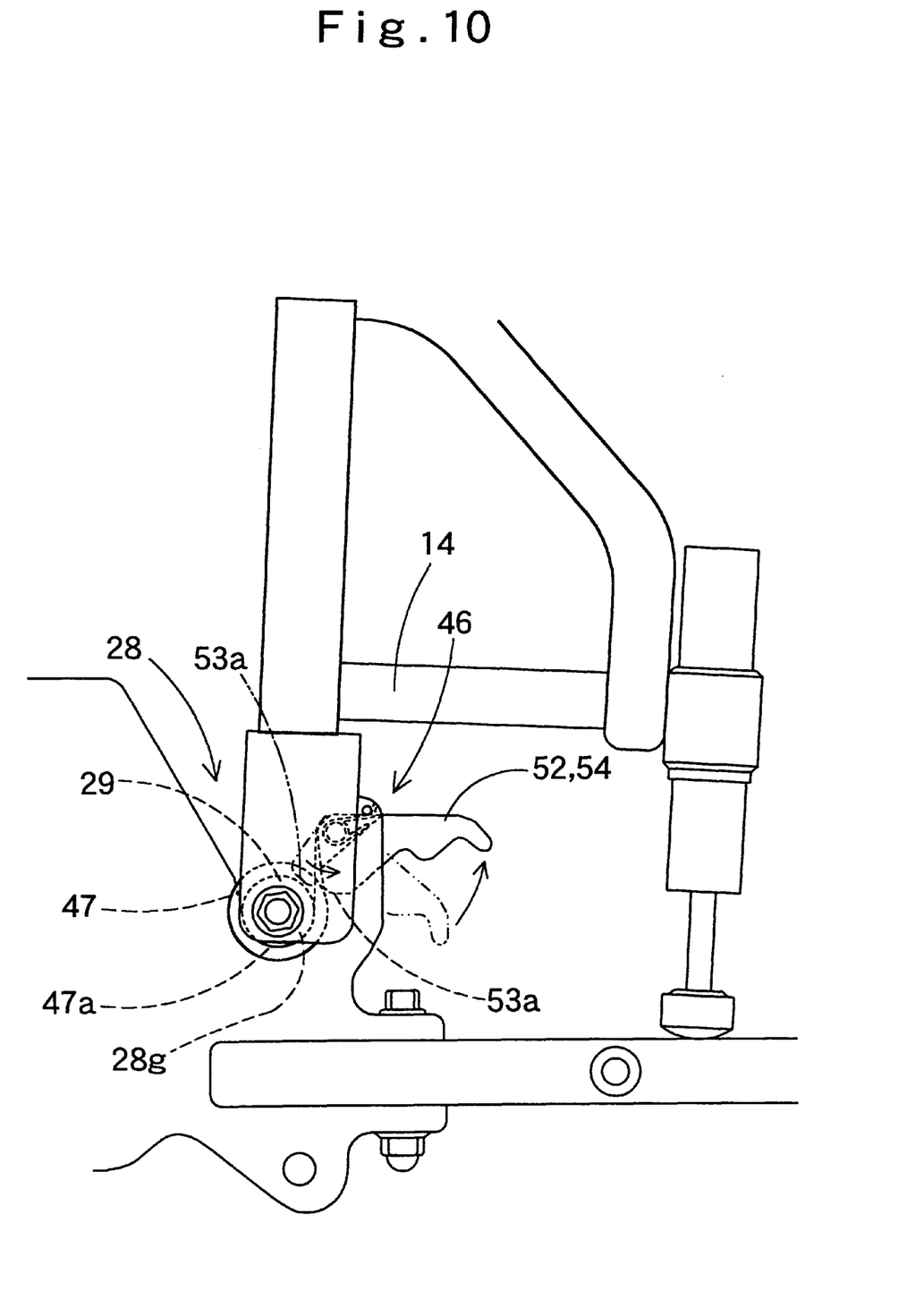
FIG. 10 is a diagram of the wheelchair in the embodiment showing operation of a hook when a receiving member is separated from a locking member.

When the wheelchair C is to be put on a vehicle, as shown in FIG. 10, at first, the holding lever 54 of the hook 52 is held and restored upward. The locking of the hook 52 to the locking surface 29 of the receiving member 28 is released. Subsequently the side of the back pipe 11 of the frame 1 is raised upward. The roller 28g of the receiving member 28 is separated from the insertion recess 47 of each locking member 46. Then the rear wheel 31 can be detached from the frame 1. In the case of the embodiment, when the holding lever 54 is held, thumb is disposed at the upper surface side of the support pipe 14 of the frame 1 and a forefinger and a middle finger are disposed at the lower surface side of the holding lever 54. If the holding lever 54 is operated so as to clench fingers, the hook 52 can be rotated easily.

And then the frame 1 is folded so that state of dash-and-dot line in FIG. 4 becomes state of solid line. The folded frame 1 and the rear wheel part 31 at the dismantled state are put on a vehicle.

Consequently in the assembling structure of the wheelchair C of the embodiment, the rear wheel part 31 can be easily assembled with or detached from the frame 1 by the operation of the hook 52. Further the frame 1 can be also folded. Therefore even if the wheelchair C is heavy, it can be easily housed in a vehicle with narrow housing space. Also the wheelchair C can be assembled easily by the operation of the hook 52.

Particularly in the embodiment, the wheelchair C is an electrically-driven wheelchair where an electric motor unit 53 driving a main rear wheel 34 is arranged at a rear wheel part 31. However, the rear wheel part 31 can be transported in separated state from the frame 1. Therefore the electrically-driven wheelchair C of heavy weight can be put on a vehicle or the like.

Of course, the assembling structure of the present invention may be applied not only to the wheelchair C with the electric motor unit 33 but also to the wheelchair without the electric motor unit 33.

Further in the embodiment, the rear wheel part 31 is constituted in that a pair of main rear wheels 34 are arranged at the front side and a pair of auxiliary rear wheels 44 are arranged at the rear side. Also in the embodiment, the rear wheel part 31 is assembled to the frame 1 in rockable state in the vertical direction along the longitudinal direction, by the roller 28g at the coupling position between the locking member 46 and the receiving member 28.

Therefore the wheelchair C of the embodiment can travel stably even a portion having step difference, such as a staircase. Because the rear wheel part 31 can rock to the frame 1 in the vertical direction along the longitudinal direction as shown in dash-and-dot line in FIG. 1 (dash-and-dot line showing the base stay 40), and both the main rear wheel 34 and the auxiliary rear wheel 44 can be grounded. Of course, if this point is not considered, the auxiliary rear wheel 44 need not be provided. Further the rear wheel part 31 need not be assembled to the frame 1 in rockable state in the vertical direction along the longitudinal direction.

When the rear wheel part 31 is not assembled to the frame 1 in rockable state in the vertical direction along the longitudinal direction, following constitution may be done. That is, the receiving member 28 is not made the cylindrical roller 28g as in the embodiment, but the receiving member is simply made a convex shape. The surface at the back side in the convex shape being away from the hook may be made the locking surface 29 which can be locked by the locking piece 53.

Further in the wheelchair C of the embodiment, the insertion recess 47 of the locking member 46 is opened at the upper side and is formed substantially in the vertical direction. Therefore when the rear wheel part 31 is assembled to the frame 1, the roller 28g of each receiving member 28 can be simply inserted to the bottom part 47a of the insertion recess 47 in the locking member 46 utilizing the gravity. In this case, the locking surface 29 in the roller 28g of the receiving member 28 can be locked automatically to the defining surface 53a of the hook locking piece 53 in the locking member 46. Therefore the rear wheel part 31 can be assembled to the frame 1 quite simply.

If the insertion recess 47 of the locking member 46 is formed substantially in the vertical direction, following working and effect can be obtained. That is, the position defining in the longitudinal direction of the receiving member 28 is performed not by the hook 52 but by the circumferential surface of the longitudinal direction in the insertion recess 47. Therefore the coupling strength of the receiving member 28 to the locking member 46 in the moving direction (longitudinal direction) of the wheelchair C can be improved.

If such point is not considered, the insertion recess 47 of the locking member 46 may be formed in the horizontal direction or may be bent in L-like shape.

In the embodiment, the two locking members 46 are arranged at the side of the rear wheel part 31 and the two receiving member 28 are arranged at the side of the frame 1. As the modification of the assembling structure, however, at least one set of the locking member 46 and the receiving member 28 may be arranged at the reverse side.

Also in the embodiment, two sets of the locking members 46 and the receiving members 28 corresponding to the locking members 46 are arranged. However, if the rear wheel part 31 can be assembled to the frame 1 stably, one set of the locking member 46 and the receiving member 28 or three sets or more may be assembled to the wheelchair.

What is claimed is:

1. An assembling structure of an electrically-driven wheelchair having a frame and a rear wheel part, wherein the rear wheel part is assembled in a detachable state to the rear side of the frame, said frame being collapsible into a folded state, said rear part including a pair of main rear wheels arranged at the front side, and a pair of auxiliary rear wheels arranged at the rear side, wherein both the main rear wheels and the auxiliary rear wheels are arranged to be grounded, an electric motor unit for driving the main rear wheels, arranged at the main rear wheels, the rear wheel part and the rear side of the frame including a locking member and a receiving member, which can be coupled with each other and are arranged respectively thereon, the receiving member including a concave locking surface at a side remote from the locking member, the locking member including with an insertion recess in which the receiving member can be inserted, and with a hook which can lock the locking surface of the receiving member inserted in the insertion recess, wherein the rear wheel part is assembled to the frame at a coupling portion between the locking member and the receiving member, in a rockable state in the vertical direction along the longitudinal direction as the center of rocking the receiving member.

2. The assembling structure of a wheelchair as set forth in claim 1, wherein the hook is constituted by a locking piece arranged at the top end side for locking the locking surface, and a holding lever arranged at the base side for holding the locking surface while the locking of the locking surface is released, the hook is biased by the biasing means so that it can be restored to the arrangement position to allow locking of the locking surface, and the hook is pivotally supported between the locking piece and the holding lever in rotatable state to the bottom part side of the insertion recess and is arranged to the locking member, and when the receiving member is inserted in the insertion recess of the receiving member, the locking piece is pushed by the receiving member and is rotated to the bottom part side of the insertion recess, and when the receiving member is arranged to the bottom part of the insertion recess, the hook is restored to the arrangement position to allow locking of the locking surface by the biasing force of the biasing means.

3. The assembling structure of a wheelchair as set forth in claim 1, wherein the insertion recess of the locking member is opened at the upper side and is formed substantially in the vertical direction.

4. The assembling structure of a wheelchair as set forth in claim 3, wherein the locking member is arranged at the side of the rear wheel part and the receiving member is arranged at the frame side.

* * * * *